United States Patent

Henricson et al.

[11] Patent Number: 5,328,563
[45] Date of Patent: Jul. 12, 1994

[54] METHOD OF TREATING MATERIAL CONTAINING SODIUM SULPHATE AND/OR SODIUM CARBONATE IN A PULP MILL

[75] Inventors: Kaj Henricson, Kotka; Anja Klarin, Espoo, both of Finland

[73] Assignee: A. Ahlstrom Corporation, Noormarkku, Finland

[21] Appl. No.: 943,234

[22] Filed: Sep. 11, 1992

[30] Foreign Application Priority Data

Sep. 27, 1991 [FI] Finland .................. 914586

[51] Int. Cl.$^5$ ............................................. D21C 11/04
[52] U.S. Cl. .................... 162/30.1; 162/29; 162/30.11; 423/415.1
[58] Field of Search .......... 162/29, 30.1, 30.11; 423/415 A, 428, 566, 566.2, 563; 585/638

[56] References Cited

U.S. PATENT DOCUMENTS

| | | | |
|---|---|---|---|
| 2,106,952 | 2/1938 | Konig | 423/566.2 |
| 2,711,430 | 6/1955 | Hagglund | 260/609 |
| 3,236,589 | 2/1966 | Reinhall | 423/428 |
| 3,322,492 | 5/1967 | Flood | 423/428 |
| 3,762,989 | 10/1973 | Timpe | 162/16 |
| 3,867,251 | 2/1975 | Holme | 162/30.1 |
| 4,439,272 | 3/1984 | Nguyen | 162/30.11 |

FOREIGN PATENT DOCUMENTS 983213 2/1976 Canada.
27748 11/1955 Finland.
3219/72 5/1973 Finland.

OTHER PUBLICATIONS

"Lignins", Wiley Interscience, 1971, pp. 806–817, 828.

Primary Examiner—W. Gary Jones
Assistant Examiner—Dean T. Nguyen
Attorney, Agent, or Firm—Nixon & Vanderhye

[57] ABSTRACT

Sodium sulphate and/or sodium carbonate containing material from a cellulose pulp mill, such as fly ash from a recovery boiler, or a by-product from a chlorine dioxide production plant, is brought into contact with a a gas containing hydrocarbons and/or hydrogen sulphide which chemically reacts with the material to produce sodium sulphide. Preferably the gas contains one or both of ethene and hydrogen sulphide. The sodium sulphide produced is used to effect sulphate cooking of cellulose pulp. The gas may be brought into contact with the melt of a soda recovery boiler to increase its sulphidity, either prior to, after, or simultaneously with bringing the gas into contact with the material. The sources of the fly ash and melt may be a soda recovery boiler combusting black liquor under oxidizing conditions.

11 Claims, 3 Drawing Sheets

METHOD OF TREATING MATERIAL CONTAINING SODIUM SULPHATE AND/OR SODIUM CARBONATE IN A PULP MILL

BACKGROUND AND SUMMARY OF THE INVENTION

During the manufacture of chemical cellulose pulp in the pulp and paper industry the waste liquor obtained, known as "black liquor", is typically combusted in a soda recovery boiler to recover chemicals and heat. In a conventional recovery boiler the process chemical is recovered by injecting the black liquor into the boiler, so that it dries rapidly and is combusted under reducing conditions, and a melt is produced. The melt primarily contains sodium carbonate, sodium sulphide and sodium sulphate. A number of other compounds are also present, but as far as the pulp manufacture is concerned, the main components are $Na_2CO_3$ and $Na_2S$. Cooking chemicals are produced from the melt for the manufacture of pulp, and it is often preferable that the sulphidity of the cooking liquors is high. A high sulphidity liquor is preferred at the beginning of the cook, and a low sulphidity liquor in later stages. Thus it is desirable to produce cooking liquors of different sulphidities for different stages of the cook.

The flue gases of a soda recovery boiler contain significant amounts of "fly ash", which is separated in an ash cone and in electrostatic filters prior to the flue gas being removed from the boiler. The main components of the fly ash are sodium sulphate and sodium carbonate. Normally this ash is recirculated to the soda recovery boiler by mixing it with strong black liquor to be introduced into the recovery boiler. This adds to the ash load of the soda recovery boiler and thus also increases the sulphur emissions and intensifies boiler corrosion.

According to the present invention it is possible to prevent the return of ash to the recovery boiler, whereby it is possible at the same time to decrease the sulphur load of the boiler. According to the present invention the chemicals of the ash separated from the flue gases of a boiler are recovered by manufacturing sodium sulphide therefrom, which can be used for producing cooking chemicals, most preferably to increase the sulphidity of cooking liquor produced from the recovery boiler melt.

Often more than 90% of the fly ash of the soda recovery boiler is sodium sulphate. The ash usually contains about 10-20% of the entire sulphur load supplied to the recovery boiler. Sodium sulphate powder is also generated as a byproduct of $ClO_2$ production, which powder is normally used as a make-up chemical and therefore is dissolved into black liquor before the black liquor is concentrated. This dissolution results a higher sulphur load to the boiler.

Sodium sulphide may be manufactured from sodium sulphate according to the following reaction equation (1): $Na_2SO_4 + C_2H_4 \rightarrow Na_2S + 2\ H_2O + 2\ CO$. Also other hydrocarbons may take part in the reactions.

Ethene, $C_2H_4$, may be brought to the pulp mill from outside as additional chemical or it may be produced from the gases at the pulp mill containing methyl mercaptan and/or dimethyl sulphide (DMS). A sulphate mill produces a large volume and variety of sulphurous gases. Gases containing organic sulphur compounds may be generated by pressure heating black liquor, for example according to the process described in U.S. Pat. No. 4,929,307. Methyl mercaptan is oxidized to DMS, which further splits forming hydrogen sulphide and ethene, when the gas is heated, or DMS oxidizes when the pressure of the oxygen is higher, forming sulphur dioxide and ethene.

This invention takes advantage of the reducing gases coming from a black liquor heat treatment unit (U.S. Pat. No. 4,929,307) by using them directly in the reduction of the sodium sulfate based salts (i.e. from the recovery boiler or from $ClO_2$ generation) without any dissolution into black liquor and without any dead load increase of the boiler. Thus the invention helps to increase boiler capacity and prevent corrosion.

Ethene (or a like hydrocarbon), or gas containing ethene and hydrogen sulphide, is brought into contact with the material containing sodium sulphate, so that sodium sulphide is generated according to the reaction (1) above. By means of this reaction, it is possible to adjust the sulphidity of the cook by adding it to a portion of white liquor, which is generated by causticizing the green liquor produced from the melt of a soda recovery boiler. Thus two different white liquors can be produced, one the original white liquor, the other white liquor enriched with sodium sulphide. The liquor high in sulphur can be used at the beginning of the cook, and the liquor having a lower sulphur content at later stages. Alternatively, it is possible to dose the generated sodium sulphide as a separate chemical directly to the digester, preferably at the beginning of the cook.

By way of the present invention, it is possible to affect positively the sulphidity of the pulp digesting process. The present invention also has the advantage that a portion of the sulphur, the fly ash, does not recirculate to the soda recovery boiler, so that the sulphur load of the recovery boiler diminishes and thus also the sulphur emissions and corrosion are correspondingly decreased.

It is the primary object of the present invention to reduce sulphur emissions from, and corrosion of, a soda recovery boiler, while at the same time facilitating the production of high sulfidity, and different sulfidity, sulfate pulp cooking liquors. This and other objects will become clear from the detailed description and appended claims.

DETAILED DESCRIPTION OF THE DRAWINGS

In the following description the term "ash" is used in describing treatment according to the method of the present invention. However it is to be understood that the term "ash" should be interpreted broadly in the specification and claims so as to encompass fly ash from the flue gases of a soda recovery boiler, byproduct from a chlorine dioxide production plant, and other sodium sulphate containing waste products of a sulphate cellulose pulp mill, which may also be treated in a similar manner according to the invention.

Figure 1:
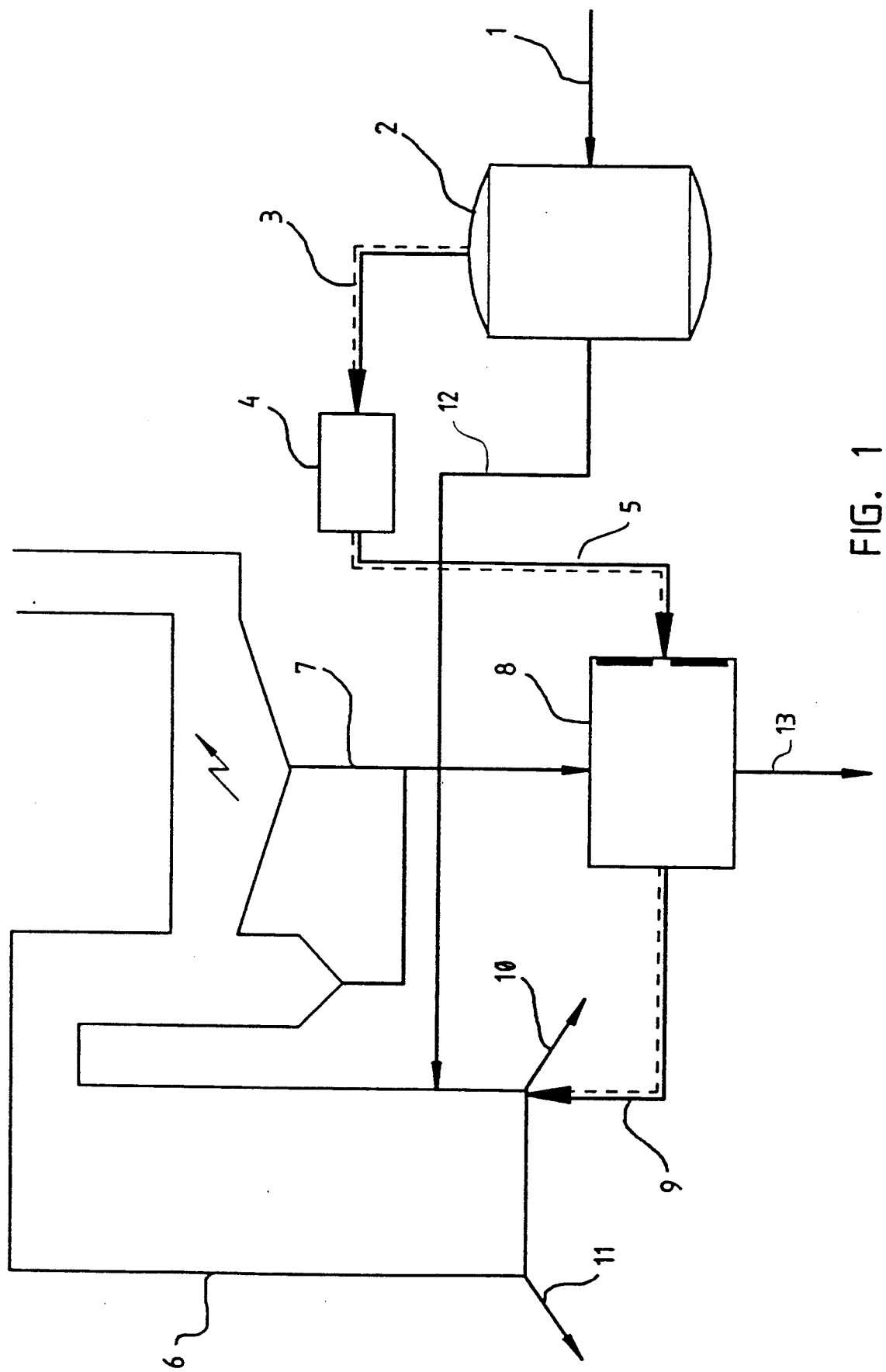
FIG. 1 is a schematic illustration of a preferred embodiment of apparatus according to the present invention for manufacturing sodium sulphide from the sodium sulphate-containing fraction of a pulp mill (ash)

FIG. 1 illustrates how to utilize the gas obtained from the pressure heating of black liquor in the manufacture of sodium sulphide. The DMS-containing gas 3 is generated during pressure heating of black liquor 1 in a reactor 2, which heating is preferably that described in U.S. Pat. No. 4,929,307, the disclosure of which is incorporated by reference herein. The gas 3 is activated by heating at stage 4 to a temperature above about 250° C., so that dimethyl sulphide is split to hydrogen sulphide and ethene according to the following reaction formula (2): $(CH_3)_2S \rightarrow H_2S + C_2H_4$. Also other hydrocarbons may form.

The increase of the temperature in stage 4 intensifies the reaction (2). If oxygen is present the hydrogen sulphide at least partially oxidizes to sulphur dioxide, but ethene is always obtained from the reaction. Gas 3 may be dried to intensify the reaction and to lower the oxygen level. If the temperature during the heat treatment of black liquor is high enough, the gas 3 may decompose completely enough so as to make preheating unnecessary.

The gas 5, containing $H_2S$ and $C_2H_4$ (or a like hydrocarbon), from stage 4 is brought into contact with $Na_2SO_4$-containing ash 7 ("fly ash") separated from the flue gases of a soda recovery boiler 6 in a contactor 8, whereby according to the formula (1) above, sodium sulphide is formed, and discharged in line 13. The sodium sulphide in line 13 is subsequently used to make sulphate cooking liquor, or brought directly into contact with chips in a digester, or added to cooking liquor. The heat treated black liquor 12 is transferred from the reactor 2 to a soda recovery boiler 6 to form a melt (10, 11).

The residual gas 9 from contactor 8—which contains substantial amounts of hydrogen sulphide and small amounts of ethene—is preferably passed to the soda recovery boiler 6, such as in the method described in patent application FI 914585 (corresponding to U.S. application serial no. 07/939,491, filed Sep. 8 1992, into contact with the melt 10 being discharged from the boiler 6. Thereby the hydrogen sulphide of the residual gas 9 reacts with the sodium carbonate in the melt 10 forming sodium sulphide according to: (3) $Na_2CO_3 + H_2S \rightarrow Na_2S + H_2O + CO_2$. The gas 9 may alternatively be introduced only into a portion of the melt, whereby the sulphur content of the melt portion 11 remains less than that of the melt portion 10. It is thus possible to manufacture from the melts 10, 11 cooking liquors having different sulphidities. Therefore, as a result of the utilization of the apparatus of FIG. 1 sodium sulphide, high $Na_2S$-containing green liquor, and low $Na_2S$-containing green liquor are produced. These may be dosed separately, or appropriately combined, in and to the digester house. The high $Na_2S$-containing green liquor may be used as such, or be causticized to white liquor prior to use. The low $Na_2S$-containing green liquor typically is causticized prior to use.

Figure 2:
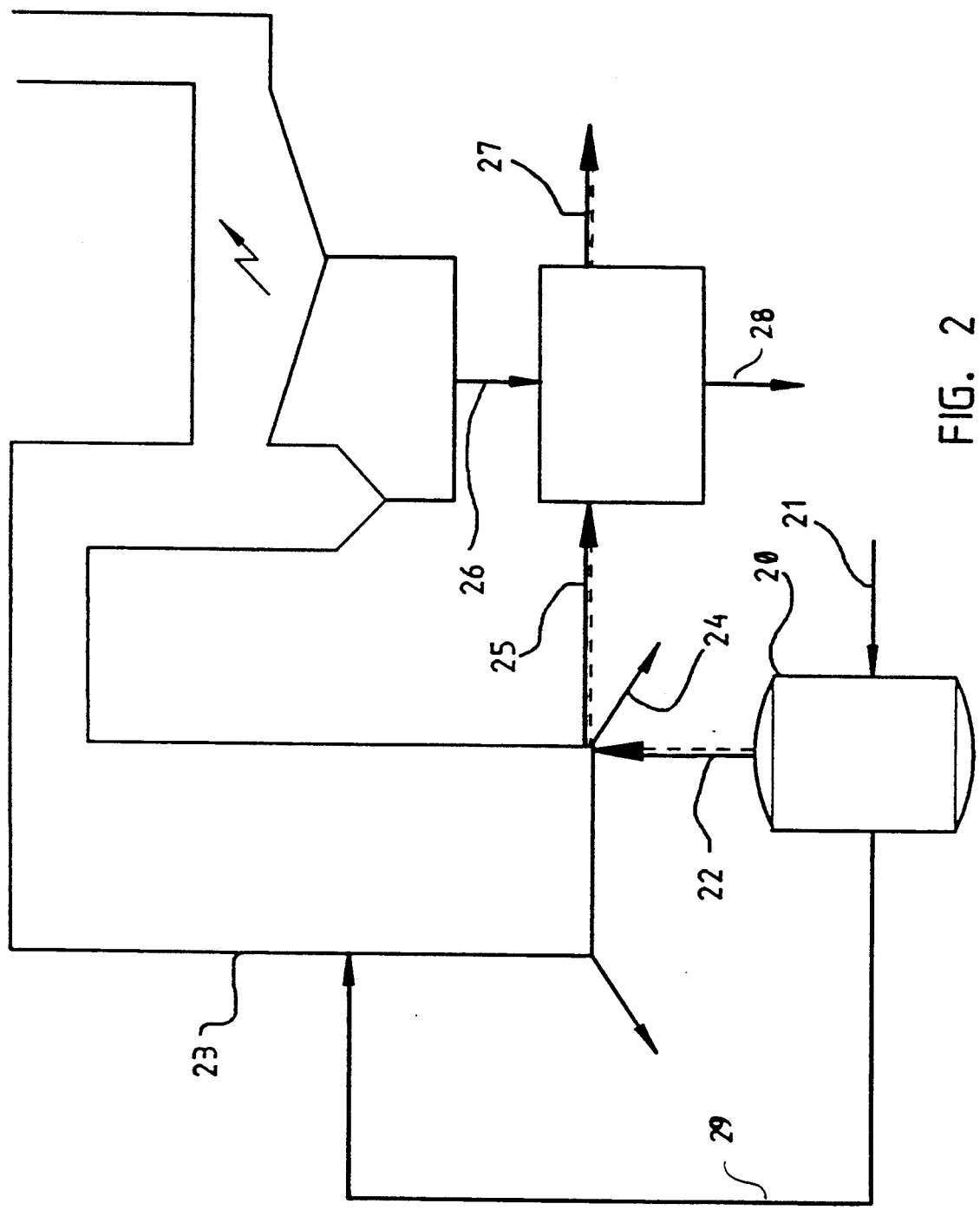
FIG. 2 is a schematic illustration of another exemplary embodiment of apparatus according to the invention.

FIG. 2 schematically illustrates the practice of a process similar to that of FIG. 1, except that the DMS-containing gas 22 generated in black liquor 21 pressure heating stage 20 is first brought into contact with the melt 24 being discharged from the soda recovery boiler 23, which—due to the high temperature of the melt 24—results in the DMS splitting into hydrogen sulphide and ethene. The heated black liquor 29 is fed to the boiler 23. The gas 22 may be, if required, preheated prior to being led to the melt 24. The sodium carbonate in the melt 24 reacts with the hydrogen sulphide in the gas 22 forming sodium sulphide, whereby the sulphidity of the melt 24 increases. The ethene-containing residual gas 25 is then brought into contact with the fly ash 26 from the soda recovery boiler 23 in order to form sodium sulphide 28. The residual gas 27 may be passed to a combustion stage, or otherwise utilized. In this case too it is possible, if desired, to treat only a portion of the melt (e.g. portion 24).

According to one alternative embodiment the ash 26 may also be treated by adding it directly to the melt (e.g. 24), and the melt and the ash are then treated simultaneously together as described in Finnish patent application 914585 with sulphur-containing and/or ethene-containing (reducing) gas.

The invention of the above described embodiments also has an advantage in that during the pressure heating of the black liquor, 30–60% of the sulphur in the black liquor is removed from it. Thus both the fly ash (e.g. 7, 26) and a considerable portion of the rest of the sulphur, which according to the prior practice is supplied to the soda recovery boiler, passes the soda recovery boiler without entering it, and thus further decreases both the boiler (e.g. 6, 23) sulphur emissions and corrosion.

Figure 3:
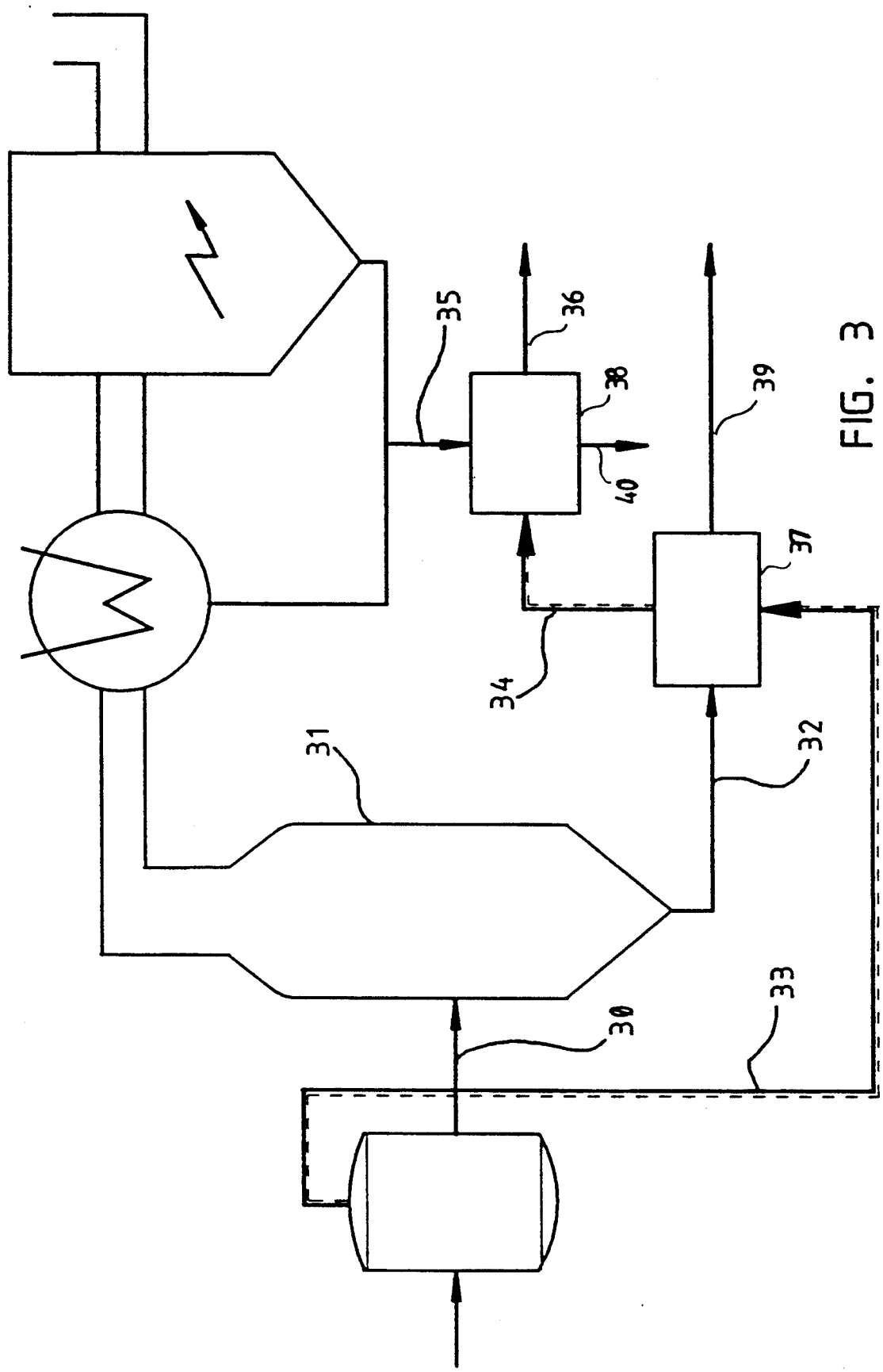
FIG. 3 is a schematic illustration of a third embodiment of exemplary apparatus according to the present invention for manufacturing sodium sulphide.

FIG. 3 illustrates yet another alternative embodiment, whereby the combustion of black liquor is carried out under oxidizing conditions. The pressure heat treated black liquor 30 is combusted in the reactor (recovery boiler) 31, producing melt 32 containing $Na_2O$, $Na_2CO_3$ and $Na_2SO_4$. The melt 32 is brought into contact with the gas 33 generated by pressure heating black liquor, and the DMS in the gas 33 splits, due to the heat energy of the melt 32, to hydrogen sulphide and ethene. The ethene further reacts with the sodium sulphate of the melt 32 in reactor 37, whereby sodium sulphide is produced in the melt 32, resulting in an increased sodium sulphide content melt 39. Sodium sulphide is also obtained when at least a portion of the sodium carbonate reacts with the hydrogen sulphide. By raising the temperature of the melt 32 prior or subsequent to the hydrogen sulphide treatment at 37, it is possible to convert sodium carbonate to sodium oxide, which when the melt 39 is dissolved becomes NaOH. Thus the conventional causticizing treatment may either be partially or completely eliminated.

The ethene of the residual gas 34 reacts in reactor 38 with the sodium sulphate of the fly ash 35 separated from flue gases of reactor 31 to form sodium sulphide 40, which may be utilized in the manufacture of cooking liquors, or added to wood chips or cooking liquor. The gas 36 is passed to a combustion stage, or otherwise utilized.

In those pulp mills in which the solids content of black liquor entering the combustion stage is high, it has been found that the $Na_2CO_3$-content of the fly ash is also high even above 50% In this case it is also possible to manufacture sodium sulphide by treating the ash with gas containing hydrogen sulphide and ethene (or like hydrocarbon). Thus $Na_2SO_4$ and $Na_2CO_3$ are converted—according to reaction equations (1) and (3)—to $Na_2S$. If the $Na_2CO_3$ content of the fly ash is especially high, it may be preferable to causticize it, and not to convert it to sodium sulphide.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of treating a cellulose pulp mill ash containing sodium sulphate and/or sodium carbonate to produce pulp cooking chemical, in a pulp mill containing a recovery boiler, comprising the step of:
 (a) bringing cellulose pulp mill ash containing sodium sulphate and/or sodium carbonate, the ash selected from the group consisting essentially of fly ash from the recovery boiler and by-product from a chlorine dioxide production plant, into contact with a sulphurous gas, selected from the group consisting essentially of hydrocarbons and hydrogen sulphide, in a contactor located outside of the recovery boiler to produce sodium sulphide.

2. A method as recited in claim 1 wherein step (a) is practiced by bringing the ash into contact with a sulphurous gas from the cellulose pulp mill.

3. A method as recited in claim 1 comprising the further step of pressure heating black liquor to obtain a sulphurous gas, and wherein step (a) is practiced by bringing the ash into contact with the sulphurous gas from the pressure heating of black liquor.

4. A method as recited in claim 1 comprising the further step of treating a sulphurous gas from the pulp mill so as to obtain ethene, hydrogen sulphide, or a mixture of ethene and hydrogen sulphide; and then using the gas obtained in the practice of step (a).

5. A method as recited in claim 4 comprising the further step of passing the gas containing ethene, hydrogen sulphide, or a mixture of ethene and hydrogen sulphide, into contact with melt of a recovery boiler.

6. A method as recite din claim 1 wherein step (a) is practiced by passing a sulphurous gas from the cellulose pulp mill into contact with the melt of a recovery boiler, inherently increasing the sodium sulphide content of the melt, and the passing the gas into contact with the ash.

7. A method as recited in claim 1 wherein step (a) is practiced by simultaneously bringing the ash and gas into contact with the melt from a soda recovery boiler.

8. A method as recited in claim 1 comprising the further step (b) of bringing the gas consisting essentially of hydrocarbons and hydrogen sulphide from step (a) into contact with boiler.

9. A method as recited in claim 8 wherein step (b) is practiced by bringing the gas into contact with the melt prior to being brought into contact with the ash.

10. A method as recited in claim 8 wherein step (b) is practiced by bringing the gas into contact with the melt simultaneously with being brought into contact with the ash.

11. A method as recited in claim 8 wherein step (b) is practiced by bringing the gas into contact with the ash prior to being brought into contact with the melt.

* * * * *